Oct. 1, 1929.　　　F. D. HOLDSWORTH　　　1,730,274
INTERNAL COMBUSTION ENGINE
Filed Sept. 16, 1927　　　2 Sheets-Sheet 1

Inventor:
Fred D. Holdsworth.
by
Louis A. Maxson
atty.

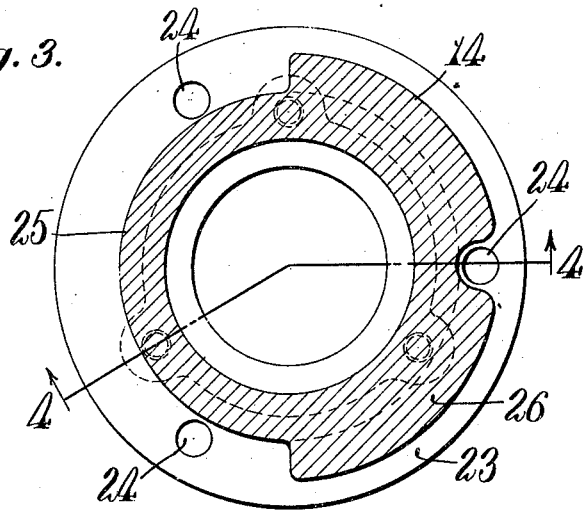
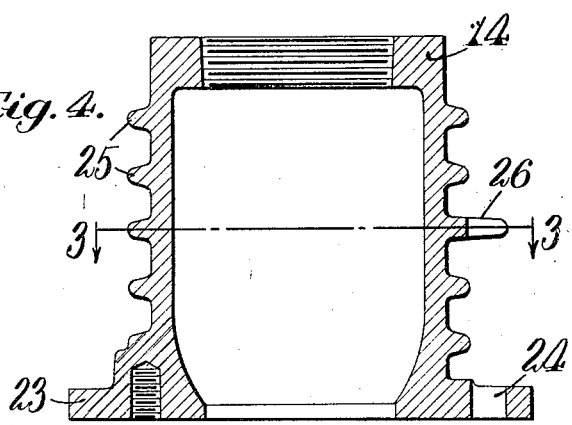
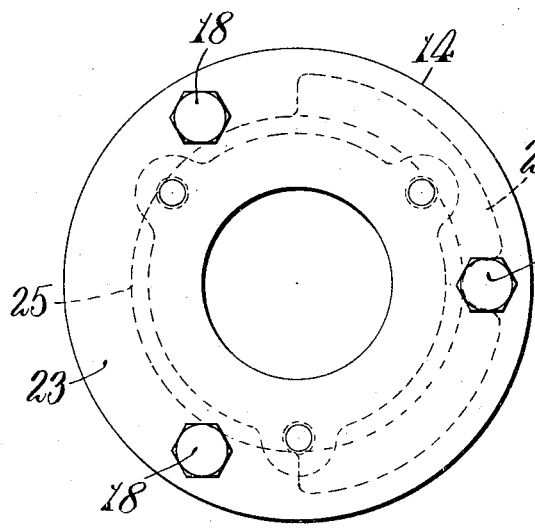

Patented Oct. 1, 1929

1,730,274

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

INTERNAL-COMBUSTION ENGINE

Application filed September 16, 1927. Serial No. 220,014.

My invention relates to internal combustion engines, and more particularly to arrangements for improving the efficiency of operation thereof.

It is a well known fact that if the intake air of an internal combustion engine is warmed up, more perfect vaporization of the fuel and improved combustion thereof will be secured. An object of the present invention is to provide improved means for warming the intake air of an internal combustion engine. A more specific object of the invention is to provide an improved air heating stove which may receive its heat from the exhaust products of the engine whose intake air it warms. Other objects and advantages of the present invention will subsequently appear.

In the accompanying drawings, in which for purposes of illustration, a preferred embodiment of the invention is disclosed, Fig. 1 is a side elevation of an internal combustion engine provided with the illustrative embodiment of my improved heating arrangement for the intake air.

Fig. 3 is a horizontal section on the line 3—3 of Fig. 4, showing the heating element proper.

Fig. 4 is a vertical section on the line 4—4 of Fig. 3.

Fig. 5 is a bottom plan view of the heating element with the flange to which the same is adapted to be connected shown in dotted line construction.

Figure 1:
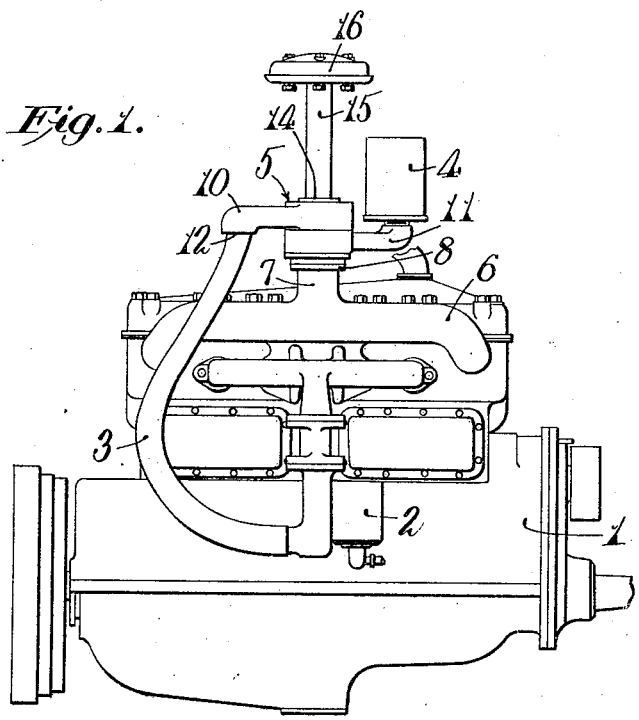
Figure 2:
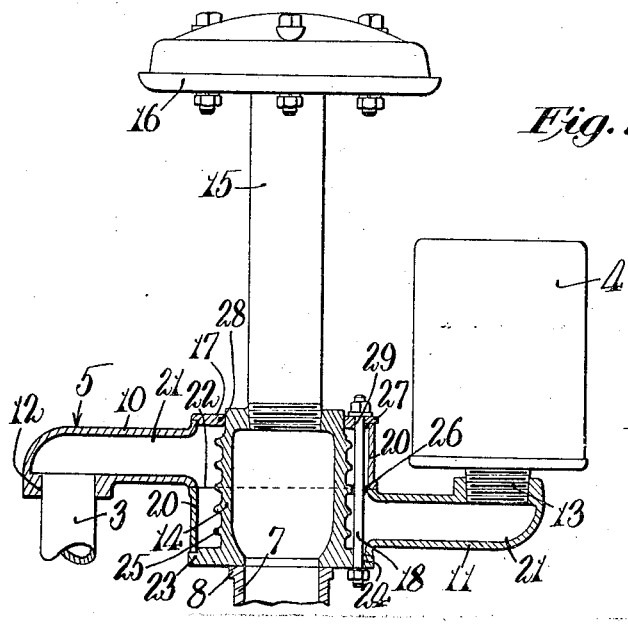
Fig. 2 is a detail view on an enlarged scale and with the heating mechanism proper shown in vertical section.

Referring to the drawings, an internal combustion engine 1 having a carburetor 2 is supplied with air through a flexible intake pipe 3 to which fluid is admitted by passing first through an air cleaner 4 and then through the illustrative embodiment of my improved heating mechanism which is generally designated 5. The exhaust manifold 6 of the engine discharges by way of an upward connection 7 terminating in a flange 8 of general triangular outline. Upon the flange 8 is supported my improved heating mechanism which is generally designated 5.

The heating mechanism 5 comprises chamber forming means comprising a pair of substantially identical upper and lower elements 10 and 11, the former being connected at 12 to the flexible intake conduit 3 and the latter supporting at 13 the air cleaner 4. The heating device 5 further comprises a heating element 14 to which is threadedly connected the exhaust pipe 15 which supports a muffler 16, and finally comprises an upper closure member 17. The members 10, 11, 14, 17 are held in assembled relation by bolts 18 and the entire mechanism is supported upon the flange 8 to which the element 14 is suitably bolted as indicated in dotted lines in Figs. 3 and 5.

Each of the elements 10 and 11 comprises a cylindrical body portion 20 with which a conduit portion 21 is integrally formed. The conduit portions have the connection receiving openings 12 and 13 formed in lateral walls thereof, the elements 10 and 11 being formed identically save that, in view of the detail differences of the connections to the flexible conduit 3 and the air cleaner 4, the openings 12 and 13 are not identical. The members 10 and 11 abut in a horizontal plane about midway of the length of the stove portion 14 having plane surfaces 22 which permit these parts to be turned relative to each other.

The heating element 14 is generally cylindrical in construction and is provided at its lower side with a flange 23 having openings 24 through which the bolts 18 extend. The periphery of the element 14 is provided with a series of heat transmitting flanges 25 and with a wider partition flange 26 which extends nearly but not quite out to the wall of the elements 10 and 11. The partition flange is about 180 degrees in circumferential extent and is arranged to prevent most of the air from passing upward until after it passes the middle of the heater.

The flange member 17 is an annulus having a thin portion 27 seating upon the upper end of the member 10 and a thicker portion 28 providing an annular shoulder and perforated at 29 to receive the bolts 18. It is thus apparent that the bolts 18 do not engage any part of either element 10 or 11. These elements slidably engage each other; and slidably engage the thin portion 27 and the flange 23 respectively.

With the parts assembled, it will be evident that the air passing through the cleaner 4 and connection 13 will pass through the conduit portion 21 of the lower member 11 and mostly horizontally until the central vertical plane extending at right angles to the conduit portion 21 is passed, and will then pass upwardly into the section 10 through which it will pass to the opening 12. The heat in the products of combustion will be transmitted through the flanges 25 and 26 and the wall of the element 14 to the air as it passes through the central chamber of the stove.

By reason of the construction of the members 10 and 11 these may be easily turned upon each other so that the position of the air cleaner or of the flexible connection may be varied as may be desired. For instance, if the operator wishes to get at a part of the engine which is back of the air cleaner, the bolts 18 are loosened and the element 11 carrying the air cleaner is swung about, so that free access may be had to the desired point. The bolts 18 may then be tightened to securely hold the assembly in place. The elements 10 and 11 may be disposed diametrically opposite each other, or in any angular relation desired; and on either side of the heater 14 or on the same side thereof.

From the foregoing description it will be evident that I have provided an improved and very simple heating stove for the intake air of an internal combustion engine, one in which the parts may be very simply made and may be readily adjusted and in which a minimum number of different patterns or the like are essential. It will further be noted that the heat transmitted to the intake air is abstracted from the waste products of combustion with a resultant increase in efficiency of the power plant.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an apparatus of the character described, in combination, a heating element adapted to constitute a portion of a conduit for the discharge of waste products of combustion, and means forming a substantially cylindrical casing surrounding said element, said casing being divided transversely into two contacting sections adapted to rotate relative to each other about the axis of the cylinder and one section being provided with a supply connection and the other being provided with a discharge connection.

2. In an apparatus of the character described, in combination, a heating element adapted to constitute a portion of a conduit for the discharge of waste products of combustion, and means forming a casing surrounding said element and having supply and discharge connections, said casing forming means comprising a pair of substantially identical parts each part including an open-ended portion adapted to surround said element and a conduit portion opening into the first mentioned portion, said parts being assembled with the open ends abutting each other the edges thereof being smooth to permit rotation of one part with respect to the other.

3. In an apparatus of the character described, in combination, a heating element adapted to form a portion of a conduit for the discharge of combustion products and having at one end thereof a peripheral flange, a member forming a flange and adapted to be arranged at the opposite end of said element, and a casing consisting of a plurality of sections held in end to end abutting relation between said flanges and surrounding said heating element, one of said sections being rotatable about said heating element and providing an opening adjacent one end of said casing and another being rotatable about said heating element and providing an opening adjacent the other end of said casing.

4. In an apparatus of the character described, in combination, a heating element adapted to constitute a portion of a conduit for the discharge of waste products of combustion, and means forming a casing surrounding said element and having supply and discharge connections, said casing forming means comprising a pair of substantially identical parts, one providing an intake and the other a discharge, said parts being in end to end contacting relation and having smooth edges so as to be rotatable with respect to each other about said conduit.

5. In an apparatus of the character described, in combination, a heating element adapted to form a portion of a conduit for the discharge of combustion products and having at one end thereof a peripheral flange, a member forming a flange and adapted to be arranged at the opposite end of said element, and a casing consisting of a plurality of sections clamped in end to end abutting relation between said flanges and surrounding said heating element, one of said sections being rotatable about said heating element and providing an opening adjacent one end of said casing and another being rotatable about said heating element and providing an opening adjacent the other end of said casing, said heating element having a baffle partially dividing said casing into two chambers.

In testimony whereof I affix my signature.

FRED D. HOLDSWORTH.